(12) United States Patent
Kawai et al.

(10) Patent No.: US 7,169,487 B2
(45) Date of Patent: Jan. 30, 2007

(54) MAGNETIC RECORDING MEDIUM

(75) Inventors: Hisao Kawai, Tokyo (JP); Teiichiro Umezawa, Tokyo (JP); Hirotaka Tanaka, Tokyo (JP); Masaki Uemura, Tokyo (JP)

(73) Assignees: Hoya Corporation, Tokyo (JP); Hoya Magnetics Singapore Pte. Ltd., Singapore (SG)

( * ) Notice: Subject to any disclaimer, the term of this patent is extended or adjusted under 35 U.S.C. 154(b) by 200 days.

(21) Appl. No.: 10/319,566

(22) Filed: Dec. 16, 2002

(65) Prior Publication Data

US 2003/0152810 A1    Aug. 14, 2003

(30) Foreign Application Priority Data

Dec. 14, 2001 (JP) ............................. 2001/381450

(51) Int. Cl.
*G11B 5/66* (2006.01)
*G11B 5/70* (2006.01)

(52) U.S. Cl. .................................... 428/832

(58) Field of Classification Search .......... 428/694 TS, 428/694 ST, 694 SG, 900, 832, 831, 831.2
See application file for complete search history.

(56) References Cited

U.S. PATENT DOCUMENTS

| | | | |
|---|---|---|---|
| 4,735,840 A | 4/1988 | Hedgcoth | |
| 4,840,845 A | 6/1989 | Tamai | |
| 5,582,897 A | 12/1996 | Kaneko et al. | |
| 6,593,009 B2 * | 7/2003 | Bian et al. | ................... 428/611 |
| 6,821,653 B2 * | 11/2004 | Fukushima et al. | ... 428/694 SG |
| 2002/0055017 A1 * | 5/2002 | Fukushima et al. | ... 428/694 SG |
| 2003/0008178 A1 * | 1/2003 | Bian et al. | ............. 428/694 TS |
| 2003/0091868 A1 * | 5/2003 | Shimizu et al. | ...... 428/694 TM |
| 2003/0134153 A1 * | 7/2003 | Lee et al. | ............. 428/694 BR |

FOREIGN PATENT DOCUMENTS

| | | | |
|---|---|---|---|
| JP | 02-168427 A | | 6/1990 |
| JP | 02-198030 A | | 8/1990 |
| JP | 11-219511 A | | 8/1999 |
| JP | 2001-209927 A | | 8/2001 |
| JP | 2001-331934 A | | 11/2001 |

OTHER PUBLICATIONS

Machine translation of JP 11219511, Aug. 1999.*
Machine translation of JP 2001209927, Aug. 2001.*
Machine translation of JP 2001-331934, Nov. 2001.*

* cited by examiner

*Primary Examiner*—Holly Rickman
(74) *Attorney, Agent, or Firm*—Sughrue Mion, PLLC

(57) ABSTRACT

In a magnetic recording medium including a glass substrate (1) having a principal surface on which at least a magnetic layer (4) is formed, the magnetic recording medium has a coercive force of 2500 oersted or more in a circumferential direction thereof. The principal surface of the glass substrate is provided with a texture having a predetermined surface roughness so that the magnetic layer is given circumferential magnetic anisotropy. The magnetic recording medium further includes a magnetic anisotropy inducing layer (2) formed between the glass substrate and the magnetic layer so that the magnetic recording medium has an oriented ratio (OR) of 1.1 or more. The oriented ratio (OR) is defined as a ratio of a magnetic characteristic in circumferential direction to another magnetic characteristic in the radial direction.

22 Claims, 1 Drawing Sheet

MAGNETIC RECORDING MEDIUM

BACKGROUND OF THE INVENTION

This invention relates to a magnetic recording medium for carrying out information recording and reproducing operations and, in particular, to a magnetic disk used in a magnetic recording/reproducing apparatus such as a HDD (Hard Disk Drive).

A magnetic recording medium used in a magnetic recording/reproducing apparatus such as a HDD (Hard Disk Drive) is increased in coercive force in order to meet the recent demand for a higher recording density. On the other hand, in order to achieve a higher recording density, the decrease in medium noise is indispensable. In the past, the decrease in medium noise is achieved by reducing Mr·t (the product of residual magnetization and film thickness) or by improving a film structure or a film material of the magnetic recording medium, with the help of uninterrupted improvement in output characteristics of a magnetic head.

It is noted here that Mr represents residual magnetization and t represents the thickness of a magnetic layer.

The reduction in Mr·t is extremely effective in improving R/W (read/write) characteristics but simultaneously causes a problem of thermal decay. Generally, the decrease in Mr·t is designed by reducing the thickness t of the magnetic layer. The reduction in thickness t brings about miniaturization of the grain size of the magnetic layer, resulting in reduction of the medium noise. However, with the increase in recording density, miniaturized crystal grains no longer have a coercive force (Hc) sufficient to hold recorded magnetization as a recorded signal. As a result, the thermal decay, i.e., the phenomenon that the recorded signal is attenuated, becomes remarkable.

As a magnetic recording medium capable of preventing the phenomenon (thermal decay) that the recorded signal is attenuated and of obtaining a high coercive force, attention is attracted to a magnetic recording medium comprising a substrate having a texture formed on the substrate along a circumferential direction thereof to thereby improve magnetic anisotropy in the circumferential direction. Generally, the magnetic anisotropy is represented by an OR (Oriented Ratio) which is a ratio of a magnetic characteristic in circumferential direction to another magnetic characteristic in the radial direction. Generally, excellent thermal decay resistance is achieved by a greater OR. Herein, the magnetic characteristic may be a coercive force (Hc) or the product of residual magnetization and film thickness (Mr·t).

A magnetic recording medium having magnetic anisotropy is proposed, for example, in U.S. Pat. No. 4,735,840. The magnetic recording medium comprises a substrate with a circumferential texture formed on its surface and an underlayer, a magnetic layer, a protective layer, and a lubrication layer successively formed on the substrate. In this technique, use may be made of an aluminum substrate, a glass substrate, or a polycarbonate substrate having an NiP alloy film.

In recent years, the demand for a higher recording density and a lower cost of the magnetic recording medium becomes more and more strict. The substrate with the NiP alloy film requires a complicated process and is an inhibiting factor against the reduction in cost.

The glass substrate high in rigidity and flatness allows a low flying height of a magnetic head. Therefore, the glass substrate recently attracts attention as a substrate suitable for an increase in recording density. Therefore, it is predicted that the glass substrate with a circumferential texture directly formed on its surface without forming the NiP alloy film is desired. However, a magnetic recording medium provided with the circumferential texture directly formed on the surface of the glass substrate has an oriented ratio (OR) which hardly satisfies a desired level. Thus, such glass substrate is insufficient to meet the recent demand for a higher recording density.

According to the research by the present inventors, the above-mentioned oriented ratio (OR) is as small as about 1.03 when the underlayer, the magnetic layer, the protective layer, and the lubrication layer are successively formed on the glass substrate with the circumferential texture directly formed on its surface. In particular, it has been found out that the magnetic recording medium having a high coercive force (for example, about 2500 oersted or more) is difficult to be given a high oriented ratio (OR) of, for example, 1.1 or more.

SUMMARY OF THE INVENTION

It is therefore an object of this invention to provide a magnetic recording medium high in coercive force, excellent in magnetic anisotropy (oriented ratio), and superior in thermal decay resistance.

It is another object of this invention to provide a magnetic recording medium having excellent recording/reproducing characteristics such as low medium noise (high S/N ratio) in addition to the above-mentioned characteristics.

In order to achieve the above-mentioned objects, this invention has following structures.

Structure 1

A magnetic recording medium comprising a glass substrate having a principal surface on which at least a magnetic layer is formed, wherein:

the magnetic recording medium has a coercive force of 2500 oersted or more in a circumferential direction thereof;

the principal surface of the glass substrate being provided with a texture having a predetermined surface roughness so that the magnetic layer is given circumferential magnetic anisotropy;

the magnetic recording medium further comprising a magnetic anisotropy inducing layer formed between the glass substrate and the magnetic layer so that the magnetic recording medium has an oriented ratio (OR) of 1.1 or more, the oriented ratio (OR) being defined as a ratio of a magnetic characteristic in circumferential direction to another magnetic characteristic in the radial direction.

Structure 2

A magnetic recording medium as described in structure 1, further comprising an alloy layer of an amorphous structure interposed between the glass substrate and the magnetic anisotropy inducing layer.

Structure 3

A magnetic recording medium comprising a glass substrate having a principal surface on which at least a magnetic layer is formed, wherein:

the principal surface of the glass substrate is provided with a texture having a predetermined surface roughness so that the magnetic layer is given circumferential magnetic anisotropy;

the magnetic recording medium further comprising an AlRu alloy layer formed between the glass substrate and the magnetic layer and made of a material containing Al (aluminum) and Ru (ruthenium).

Structure 4

A magnetic recording medium as described in structure 3, wherein the magnetic recording medium has a coercive force of 2500 oersted or more in a circumferential direction thereof.

Structure 5

A magnetic recording medium as described in any one of structures 3 and 4, wherein the magnetic recording medium has an oriented ratio (OR) between 1.1 and 1.5, the oriented ratio (OR) being defined as a ratio of a magnetic characteristic in circumferential direction to another magnetic characteristic in the radial direction.

Structure 6

A magnetic recording medium as described in structures 3 to 5, further comprising an alloy layer of an amorphous structure interposed between the glass substrate and the AlRu alloy layer.

In the invention described in the structure 1, the magnetic anisotropy inducing layer is a film having a function of assuring that the magnetic recording medium has the coercive force of 2500 oersted or more and the oriented ratio (OR) of 1.1 or more, even if the glass substrate is provided with the texture for giving the circumferential magnetic anisotropy to the magnetic layer. By forming the magnetic anisotropy inducing layer between the glass substrate provided with the texture and the magnetic layer, the oriented ratio (OR) of 1.1 or more and the high coercive force of 2500 oersted or more can be achieved so that the magnetic recording medium excellent in thermal decay resistance is obtained. The magnetic anisotropy inducing layer is made of a nonmagnetic material which may be a metal material or a non-metal material (an inorganic film or an organic film). Among others, a metal, particularly, an alloy is preferable in view of the crystal growth of the underlayer and the magnetic layer. A specific embodiment is described in the structure 3.

In the invention described in the structure 3, the AlRu alloy layer may be made of, for example, an AlRu alloy having a B2 crystal structure. Typically, the alloy has a composition ratio of 50 at % Al and 50 at % Ru. The alloy has the lattice constant of 0.295 nm and is therefore excellent in lattice matching with the under layer and in miniaturizing function. In view of the lattice matching with the magnetic layer, the AlRu alloy may contain a metal such as Ni, Co, and P. In order to control the crystal grain size of the AlRu alloy, an additional element such as O, N, H, He, B, C, and Ne may be contained.

By forming the above-mentioned AlRu alloy layer between the glass substrate provided with the texture and the underlayer, the magnetic recording medium having an oriented ratio (OR) of 1.1 or more and a high coercive force and excellent in thermal decay resistance is obtained.

The AlRu alloy layer preferably has a thickness between 80 and 400 angstroms. If the thickness is smaller than 80 angstroms, an excellent oriented ratio (OR) is difficult to obtain. IF the thickness exceeds 400 angstroms, low medium noise (high S/N ratio) is difficult to obtain.

The above-mentioned magnetic anisotropy inducing layer or the AlRu alloy layer must be formed between the glass substrate and the magnetic layer. The magnetic recording medium of this invention covers those embodiments in which an additional layer is interposed between the glass substrate and the magnetic anisotropy inducing layer or the AlRu alloy layer or between the magnetic anisotropy inducing layer or the AlRu alloy layer and the magnetic layer. For example, a layer (for example, a layer (such as a Cr alloy) having an amorphous structure) for suppressing the influence of the surface condition of the glass substrate may be formed between the glass substrate and the magnetic anisotropy inducing layer or the AlRu alloy layer.

Herein, as the above-mentioned layer having an amorphous structure, a Cr alloy layer having an amorphous structure is suitable. For example, use may be made of a Cr—(Ti, Ni, Ta, Nb, or the like, where the content of Ti, Ni, Ta, Nb, or the like is 30 at % or more) alloy layer having an amorphous structure or a substantially amorphous structure. Between the above-mentioned texture of the glass substrate and the magnetic anisotropy inducing layer or the AlRu alloy layer, the Cr alloy layer having an amorphous structure serves to enhance the magnetic anisotropy of the magnetic layer. In this respect, use is preferably made of a CrTi alloy or a CrNb alloy having an amorphous structure.

In this invention, the type, the glass species, the composition of the glass substrate are not specifically restricted. The glass substrate in this invention includes an amorphous glass and a crystallized glass (glass ceramics). Typically, the amorphous glass may be a silica glass, a soda lime glass, an alkali-free glass, an aluminosilicate glass, a borosilicate glass, and an aluminoborosilicate glass. In order to enhance the mechanical strength of the glass substrate, use may be made of a chemically strengthened glass subjected to low-temperature ion exchange. Typically, the crystallized glass may be a crystallized glass containing lithium disilicate, quartz (($\alpha$-quartz, $\beta$-quartz), spinel, canasite, enstatite, mulite, or cordierite as a main crystal.

In this invention, the amorphous glass substrate is preferable among the above-mentioned glass substrates. The amorphous glass substrate allows the above-mentioned texture to be successfully formed so that a high oriented ratio (OR) can be obtained. The glass substrate in this invention is preferably made of an aluminosilicate glass. The aluminosilicate glass is adapted for chemical strengthening and provides a high-rigidity glass substrate.

In this invention, the shape and the forming method of the texture directly formed on a principal surface of the glass substrate are not specifically restricted as far as the magnetic layer is given the circumferential magnetic anisotropy. For example, the shape of the texture may be (a) concentric, (b) helical, (c) a cross texture, (d) a discontinuous pattern of grooves having the shape of (a), (b), or (c) and islanded or intermittently disposed in the circumferential direction.

In order to form the texture, use may be made of a tape texturing method of forming a recess (groove) by pressing an abrasive tape wound around a rotary member, such as a roller, against the principal surface of the glass substrate while a slurry is supplied, a method of forming a recess (groove) by photolithography, a method of forming a recess (groove) by pressing a needle-like indenter, and a method of forming a protrusion or a recess (groove) by dissolving or removing a specific region of the principal surface of the glass substrate by the use of optical means such as a laser. Among others, the tape texturing method is preferable in view of the production cost.

The surface roughness and the radial pitch of the texture are adjusted in dependence upon the flying characteristic of the magnetic head and the magnetic characteristics of the magnetic recording medium. Preferably, the surface roughness of the texture is between 1.5 and 10 nm in the maximum height Rmax (measured by an atomic force microscope (AFM). The radial pitch of the texture is preferably between 0.005 and 0.7 μm, more preferably, between 0.005 and 0.05 μm. This suppresses the crystal grain growth in the radial direction. If the radial pitch of the texture is substantially regular with respect to the crystal grain size of the magnetic layer, the crystal grain size in the disk plane can be rendered uniform.

The magnetic recording medium of this invention covers another embodiment in which a seed layer and an underlayer are interposed between the glass substrate and the magnetic layer. The seed layer serves to control (miniaturize) the crystal grain size of the underlayer. For example, the seed layer is made of NiAl, AlCo, or the like having a B2 crystal structure, or Cr—(Ti, Ni, Ta, Nb, or the like, where the content of Ti, Ni, Ta, Nb, or the like is 30 at % or more) having an amorphous structure or a substantially amorphous structure.

The underlayer serves to control the orientation of the magnetic layer. For example, the underlayer may be made of Cr or a Cr alloy (CrW, CrTa, CrV, CrMo, or the like) or a multilayer structure of these materials. In particular, in case where the magnetic layer is made of a Co-based material, use may be made of a material such as CoCr, CoCrNb, CoCrB, CoCrTa, and CoCrPtTa having a hcp structure same as the crystal structure of the magnetic layer.

In this invention, the material and the thickness of the magnetic layer are not specifically limited. The material and the thickness of the magnetic layer are appropriately adjusted in dependence upon the magnetic characteristics and the recording/reproducing characteristics. As the material of the magnetic layer, use may be made of a Co alloy (CoSm, CoCr, CoNi, CoPt, CoCrNi, CoCrTa, CoNiPt, CoPtiCr, CoNiCrTa, CoPtCrNi, CoPtCrTa, CoPtCrB, CoPtCrTaB, CoPtCirTaNb, or the like), a Fe alloy (FeNdB, FeCN, or the like), a granular film having a structure in which magnetic particles such as Fe, Co, CoNiPt are dispersed in a nonmagnetic film of $SiO_2$, BN, or the like. The thickness of the magnetic layer preferably falls within a range between 50 and 500 angstroms, more preferably, between 80 and 300 angstroms in view of the decrease in Mr·t.

In the invention described in the structure 4, the magnetic recording medium has a high coercive force of 2500 oersted or more. The coercive force of the magnetic recording medium has a theoretical upper limit which does not exceed the anisotropic magnetic field (Hk) of the magnetic material. To achieve a high coercive force in the magnetic recording medium means to increase the coercive force to the level of the anisotropic magnetic field. Therefore, in the magnetic recording medium having a high coercive force, the difference from the theoretical upper limit is small. Thus, a further increase in coercive force becomes difficult. Generally, in the magnetic recording medium having magnetic anisotropy, the coercive force in the circumferential direction is improved by the texture. In case where a higher coercive force is sought, it is becomes difficult to improve the oriented ratio (OR) because of the above-mentioned reason. In the past, the magnetic recording medium having the oriented ratio (OR) of 1.1 or more can not be obtained in case where the magnetic recording medium has a coercive force of 2500 oersted (Oe) or more. In this invention, by forming the AlRu alloy layer, a high coercive force of 2500 oersted (Oe) or more can be achieved while the oriented ratio (OR) is improved to 1.1 or more. Thus, the magnetic recording medium excellent in magnetic anisotropy can be obtained.

For the magnetic layer achieving a high coercive force, use may be made of a CoSm-based material, a CoPt-based material, and a Fe-based material. The CoSm-based material may be CoSm or CoSmB. The CoPt-based material may be CoPt, CoPtCr, CoPtCrTa, CoPtCrB, CoPtCrNi, CoPtCrTaB, or CoPtCrTaNb. The Fe-based material may be FeNdB or FeCN. Among others, the CoPt-based material is preferable in view of corrosion resistance. More particularly, a CoPtCrB alloy is preferable. By the use of the CoPtCrB alloy, other characteristics including the coercive force can be kept excellent without increasing the thickness of the underlayer and, therefore, without deteriorating the S/N ratio. Preferably, the composition of CoPtCrB is 10–30 at % Cr, 4–18 at % Pt, 0.5–15 at % B, and the balance Co.

In the invention described in the structure 5, the oriented ratio (OR) falls within a range between 1.1 and 1.5. With this structure, the thermal decay resistance is improved and the low medium noise (high S/N ratio) is achieved so that the recording/reproducing characteristics are excellent. The oritented ratio (OR) can be controlled by adjusting the surface roughness and the radial pitch of the texture formed on the surface of the glass substrate, the composition and the depositing condition (such as gas pressure) of he AlRu alloy layer, the underlayer, and the magnetic layer, and so on.

DESCRIPTION OF THE PREFERRED EMBODIMENTS

Now, description will be made of a magnetic recording medium according to this invention in conjunction with specific embodiments.

First Embodiment

Figure 1:
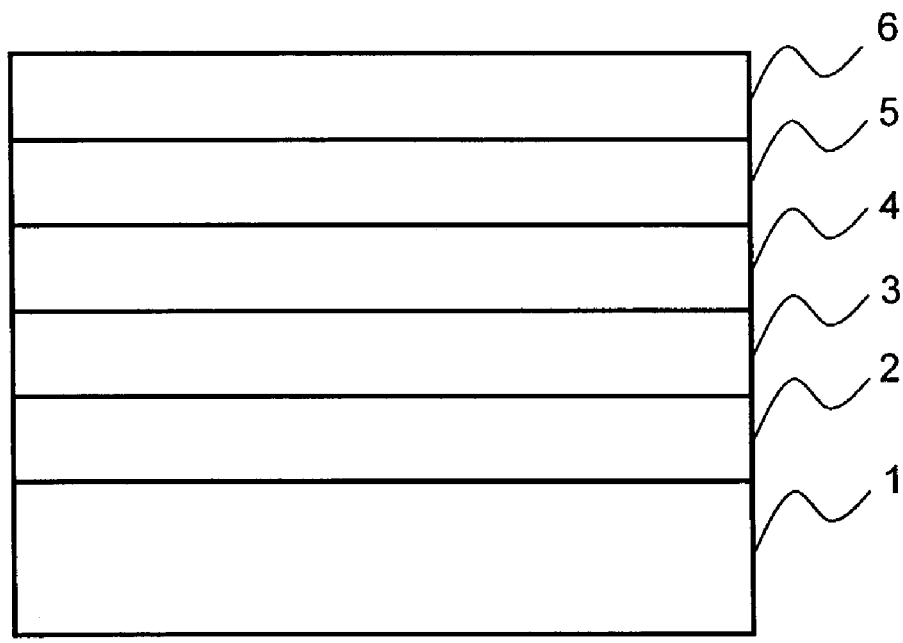
FIG. 1 shows a film structure of a magnetic recording medium according to a first embodiment of this invention.

Referring to FIG. 1, a magnetic recording medium according to a first embodiment of this invention comprises a glass substrate 1 on which an AlRu alloy layer 2 as a magnetic anisotropy inducing layer, an underlayer 3, a magnetic layer 4, a protective layer 5, and a lubrication layer 6 are successively deposited and laminated in this order.

The glass substrate 1 is a disk substrate made of an amorphous glass which is an aluminosilicate glass chemically strengthened. The glass substrate 1 is provided with a number of concentric grooves formed in a recording/reproducing area of the surface of the substrate 1 and having a maximum height (Rmax) of 5 nm and a radial pitch of 0.025 μm (measured by an atomic force microscope).

The AlRu alloy layer 2 is made of an AlRu alloy consisting of 50 at % Al and 50 at % Ru and having a B2 crystal structure. The AlRu alloy layer 2 has the thickness of 250 angstroms.

The underlayer 3 has a laminated structure of a CrW thin film (having a thickness of 100 angstroms) and a CoCrPtTa thin film (having a thickness of 25 angstroms) of a nonmagnetic hcp structure. The CrW thin film has a composition ratio of 90 at % Cr and 10 at % W. The CrW thin film is deposited by sputtering in a mixed gas atmosphere containing 0.75% $CO_2$ and Ar in order to promote miniaturization of crystal grains.

In the CoCrPtTa thin film, the contents of Co, Cr, Pt, and Ta are equal to 68 at %, 20 at %, 10 at %, and 2 at %, respectively.

The magnetic layer 4 comprises a CoPtCrB alloy thin film (having a thickness of 150 angstroms). The contents of Co, Cr, Pt, and B are equal to 61 at %, 12 at %, 20 at %, and 7 at %, respectively.

The protective layer 5 serves to prevent deterioration of the magnetic layer as a result of contact with a magnetic head. The protective layer 5 comprises a hydrogenated carbon film having the thickness of 45 angstroms. The lubrication layer 6 comprises a liquid lubricant of perfluoro polyether and serves to buffer the contact with the magnetic head. The lubrication layer 6 has a thickness of 8 angstroms.

Next, description will be made of a method of producing the magnetic recording medium having the above-mentioned structure. At first, each of opposite principal surfaces of the glass substrate is subjected to precision polishing. The glass substrate is chemically strengthened by low-temperature ion exchange. Thereafter, a number of concentric grooves (having the maximum height (Rmax) of 5 nm and the radial pitch of 0.025 μm) are formed in an entire region of the recording/reproducing area of the glass substrate by the use of a tape-type texturing apparatus.

The tape-type texturing apparatus used in this embodiment has a spindle for fixedly supporting the glass substrate, a slurry dropping port for feeding an abrasive, and a roller with a tape wound therearound. The glass substrate fixed to the spindle is rotated and the abrasive (diamond abrasive grains) is supplied from the slurry dropping port to the tape. The opposite principal surfaces of the glass substrate are clamped by the tape wound around the roller. Thus, the concentric grooves are formed on the principal surfaces of the glass substrate. The roller with the tape wound therearound is rotated at a predetermined rotation speed so that a new surface of the tape is always brought into contact with the glass substrate. At this time, by swinging the spindle, a cross texture or a helical groove can be formed.

Next, on each of the principal surfaces of the glass substrate, the AlRu alloy layer 2, the underlayer 3 comprising the CrW thin film, the magnetic layer 4, and the protective layer 5 comprising the hydrogenated carbon film are successively deposited by the use of a static opposed sputtering apparatus. The underlayer 3 is deposited by sputtering in a mixed gas atmosphere of $Ar+CO_2$. The protective layer 5 is deposited by sputtering in a mixed gas atmosphere of $Ar+H_2$. The remaining layers are deposited by sputtering in an inactive gas atmosphere of Ar. Then, a perfluoro polyether lubricant is applied on the protective layer 5 by dipping to form the lubrication layer 6. In the above-mentioned manner, the magnetic recording medium is obtained.

The magnetic recording medium thus obtained has the coercive force (Hc) of 3500 Oe (oersted) in the circumferential direction, the product of residual magnetization and film thickness (Mr·t) of 0.38 memu/cm$^2$, the coercive force squareness ratio (S*) of 0.79, the solitary wave reproduction output (LF) of 1.25 mV, the solitary wave pulse width (PW) of 12.4 nsec, the S/N ratio of 29.1 dB, the oriented ratio (OR) of 1.21 for the coercive force, the oriented ratio (OR) of 1.28 for the product of residual magnetization and film thickness, and the signal output attenuation of 0.08-dB/decade as the thermal decay resistance.

In the existing technique, the magnetic recording medium with the texture directly formed on the glass substrate has the oriented ratio (OR) on the order of 1.03 as described above. In this embodiment, the oriented ratio (OR) is remarkably improved to 1.21 or more. In addition, the coercive force as high as 3500 Oe is achieved and the thermal decay resistance is excellent. For all of the recording/reproducing characteristics including the solitary wave pulse width (PW), the S/N ratio, and the solitary wave reproduction output (LF), excellent results are obtained.

The coercive force (Hc), the product of residual magnetization and film thickness (Mr·t), the coercive force squareness ratio (S*), the solitary wave reproduction output (LF), the solitary wave pulse width (PW), the S/N ratio, the oriented ratio (OR), and the thermal decay resistance are measured in the following manner. In other embodiments, a comparative example, and a reference example, measurement is similarly carried out.

The coercive force (Hc), the product of residual magnetization and film thickness (Mr·t), the coercive force squareness ratio (S*), and the oriented ratio (OR) are measured by the use of a VSM (Vibrating Sample Magnetometer). The coercive force (Hc) is preferably as high as possible in order to improve the solitary wave pulse width (PW) and the thermal decay resistance. Specifically, it is preferable that the coercive force (Hc) is not lower than 2500 Oe (oersted). The coercive force squareness ratio (S*) is an index representing the in-plane orientation and magnetic isolation between magnetic grains. The oriented ratio (OR) is calculated as described above.

The solitary wave reproduction output (LF) is measured by a read write analyzer (Guzik). As far as other electromagnetic conversion characteristics are maintained, the solitary wave reproduction output (LF) is preferably as high as possible in order to improve the reproduction output of a recorded signal.

The solitary wave pulse width (PW50: half width of a solitary signal waveform) is measured in the following manner. By the read write analyzer (Guzik) with an MR (magnetoresistive) head, a solitary reproduction signal is extracted. PW50 is obtained as the width of a solitary waveform at 50% of a peak value of the output signal with respect to ground (0). For a high recording density, PW50 is preferably as small as possible. This is because a smaller solitary wave pulse width allows a greater number of pulses (signals) to be written in a same area. On the other hand, a greater value of PW50 causes an interference between adjacent pulses (signals) to produce an error upon reading the signal.

The S/N ratio is measured by the read write analyzer (Guzik). A magnetic head used in the measurement is a head with a GMR (Giant Magnetic Resistance) reproducing device having a flying height of 20 nm. The head has a write track width of 2.0 μm and a read track width of 0.5 μm. At the recording density (520 kfci), a carrier signal is recorded on the magnetic recording medium. Thereafter, medium noise from the DC frequency region to the 1.2×recording frequency region is monitored by the use of a spectrum analyzer. Then, the S/N ratio is calculated. Generally, the improvement of 0.5 dB in S/N ratio contributes to the improvement of 2 Gbit/inch$^2$ in recording density.

The thermal decay resistance is evaluated in the following manner.

In order to accurately evaluate only the signal attenuation due to the thermal decay of the magnetic recording medium without the influence of thermal-off-track (the phenomenon such that thermal expansion of a head suspension causes deviation or offset of the magnetic head with respect to the track on the magnetic recording medium, resulting in signal attenuation), preparation is made of an MR head with read and write devices having a write track width at least twice a read track width. The MR head is set in a head/disk mechanism in a system together with the magnetic recording medium obtained as mentioned above. Then, the head/disk mechanism is put into an environmental tank controllable in temperature in order to expose the head/disk mechanism to a high-temperature environment. When the interior of the environmental tank is stabilized at a preselected temperature, a read/write circuit sends a write signal to the write device of the MR head to write the signal into the magnetic recording medium. Immediately after the signal is written, the signal written in the magnetic recording medium is read through the read device of the MR head, amplified by the read/write circuit, and then measured by a signal evaluating portion. The signal evaluating portion records an amplitude value of the read signal at a predetermined time interval. The signal output attenuation (-dB/decade) measured in the above-mentioned manner is evaluated as an item representing the thermal decay resistance.

As the condition of the above-mentioned measurement, the environmental tank is kept at a temperature of 60° C. and the recording density of the signal written in the magnetic recording medium is 100 kfcl. The magnetic head used in this measurement has the write track width of 12.0 μm, the read track width of 2.4 μm, the write gap length of 0.35 μm, the read gap length of 0.30 μm, and the flying height of 20 nm at a part of the read and the write devices.

Second Embodiment

Figure 2:
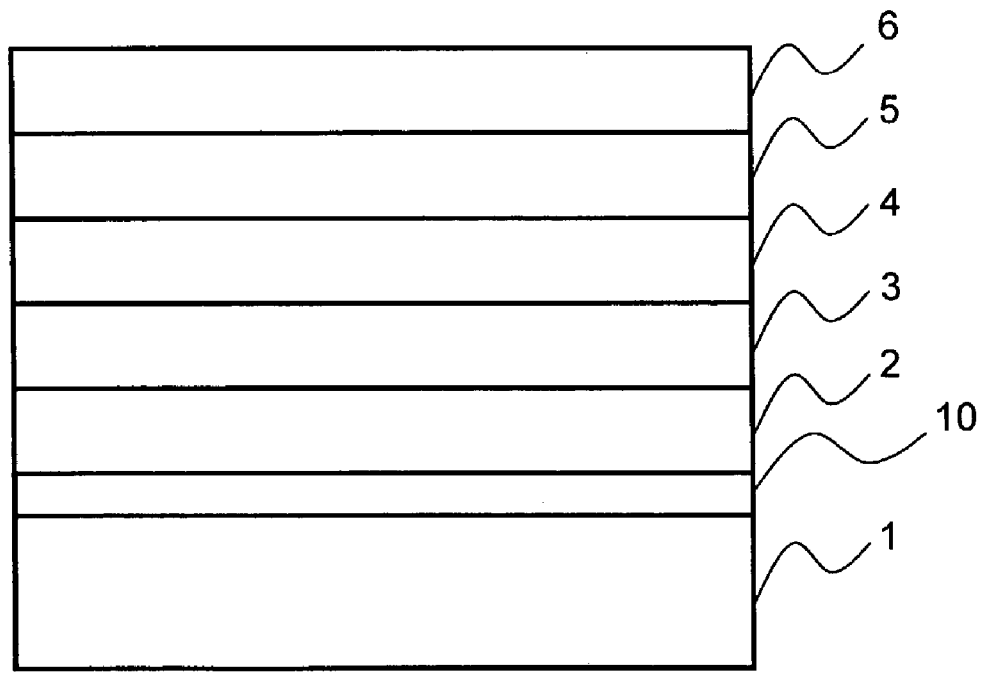
FIG. 2 shows a film structure of a magnetic recording medium according to a second embodiment of this invention.

Referring to FIG. 2, a magnetic recording medium according to a second embodiment of this invention is produced in the manner similar to the first embodiment except that a Cr alloy film 10 (having the thickness of 300 angstroms) of an amorphous structure for suppressing the influence of the surface condition of the glass substrate 1 is deposited between the glass substrate 1 and the AlRu alloy layer 2.

The magnetic recording medium thus obtained has the coercive force (Hc) of 3590 Oe (oersted) in the circumferential direction, the product of residual magnetization and film thickness (Mr·t) of 0.39 memu/cm$^2$, the coercive force squareness ratio (S*) of 0.78, the solitary wave reproduction output (LF) of 1.31 mV, the solitary wave pulse width (PW) of 12.5 nsec, the S/N ratio of 29.4 dB, the oriented ratio (OR) of 1.19 for the coercive force, the oriented ratio (OR) of 1.22 for the product of residual magnetization and film thickness, and the signal output attenuation of 0.08-dB/decade as the thermal decay resistance.

By forming the Cr alloy 10 of an amorphous structure interposed between the glass substrate 1 and the AlRu alloy layer 2, it is possible to reduce the influence of the surface condition (such as a crystal structure) of the substrate and to prevent the influence of contaminants on the surface of the substrate. As a result, the uniformity in crystal grain distribution in the AlRu alloy layer 2 is improved and the noise is decreased so that the S/N ratio is improved by 0.3 dB as compared with the first embodiment.

Third and Fourth Embodiments

Next, as a third embodiment, a magnetic recording medium is produced by the use of a CrTi alloy (60 at % Cr and 40 at % Ti) as the Cr alloy layer of an amorphous structure interposed between the glass substrate and the AlRu alloy layer in the second embodiment.

Furthermore, as a fourth embodiment, a magnetic recording medium is produced by the use of a CrNb alloy (60 at % Cr and 40 at % Nb) as the Cr alloy layer of an amorphous structure interposed between the glass substrate and the AlRu alloy layer.

Except the above, each of the magnetic recording media is similar to that of the second embodiment.

As a result, the magnetic recording medium of the third embodiment has the coercive force (Hc) of 3580 Oe (oersted) in the circumferential direction, the product of residual magnetization and film thickness (Mr·t) of 0.38 memu/cm$^2$, the coercive force squareness ratio (S*) of 0.79, the solitary wave reproduction output (LF) of 1.26 mV, the solitary wave pulse width (PW) of 12.4 nsec, the S/N ratio of 29.5 dB, the oriented ratio (OR) of 1.19 for the coercive force, the oriented ratio (OR) of 1.29 for the product of residual magnetization and film thickness, and the signal output attenuation of 0.05-dB/decade as the thermal decay resistance.

The magnetic recording medium of the fourth embodiment has the coercive force (Hc) of 3420 Oe (oersted) in the circumferential direction, the product of residual magnetization and film thickness (Mr·t) of 0.39 memu/cm$^2$, the coercive force squareness ratio (S*) of 0.79, the solitary wave reproduction output (LF) of 1.29 mV, the solitary wave pulse width (PW) of 12.4 nsec, the S/N ratio of 29.4 dB, the oriented ratio (OR) of 1.12 for the coercive force, the oriented ratio (OR) of 1.22 for the product of residual magnetization and film thickness, and the signal output attenuation of 0.07-dB/decade as the thermal decay resistance.

Taking the results of the first through the fourth embodiments into consideration, it is understood that the S/N ratio can be improved by forming an alloy layer of an amorphous structure, such as a Cr alloy layer, interposed between the glass substrate and the AlRu alloy layer. It is also understood that, between the texture and the AlRu alloy layer, the effect of improving the thermal decay resistance can be obtained.

COMPARATIVE EXAMPLE

Next, a magnetic recording medium is prepared in the manner similar to the first embodiment except that a Cr film (having a thickness of 100 angstroms) is prepared without forming the AlRu alloy layer.

The magnetic recording medium thus obtained has the coercive force (Hc) of 3570 Oe (oersted) in the circumferential direction, the product of residual magnetization and film thickness (Mr·t) of 0.33 memu/cm$^2$, the coercive force squareness ratio (S*) of 0.77, the solitary wave reproduction output (LF) of 1.24 mV, the solitary wave pulse width (PW) of 13.1 nsec, the S/N ratio of 28.4 dB, the oriented ratio (OR) of 1.02 for the coercive force, the oriented ratio (OR) of 1.04 for the product of residual magnetization and film thickness, and the signal output attenuation of 0.09-dB/decade as the thermal decay resistance.

Thus, as compared with the above-mentioned embodiments, the oriented ratio (OR) is as small as about 1.02. Although the coercive force is as high as 3570 Oe (oersted), the recording/reproducing characteristics, such as the solitary wave pulse width (PW) and the S/N ratio, and the thermal decay resistance are deteriorated.

REFERENCE EXAMPLE

Next, a magnetic recording medium is produced by the use of a substrate without forming a number of concentric grooves on the surface of the glass substrate. Instead, a NiP alloy layer is formed on the glass substrate and a number of concentric grooves are formed on the surface of the NiP alloy layer by the use of a tape-type texturing apparatus. The magnetic recording medium of the reference example has a film structure comprising a Cr film, an NiP alloy layer, an underlayer including a CrW thin film and a CoCr thin film, a CoCrPtB magnetic layer, a hydrogenated carbon protective layer, and a perfluoro polyether lubrication layer successively formed on the glass substrate in this order. The NiP alloy layer is formed by sputtering and has a thickness of 800 angstroms. The remaining layers are similar in material, composition, and thickness to those of the above-mentioned embodiments.

As a result, the oriented ratio (OR) for the coercive force is equal to 1.19 and the oriented ratio (OR) for the product of residual magnetization and film thickness is equal to 1.26. The magnetic characteristics and the recording/reproducing characteristics are similar to those in the first embodiment. However, in a recording/reproducing test by the use of the MR head, a signal error is detected. The signal error is a thermal asperity. A portion where the signal error occurred is analyzed by EDX (Energy Dispersive X-ray). It has been found out that a foreign matter of NiP is present.

The magnetic recording medium of this invention is not restricted to those in the foregoing embodiments. By adjusting the surface roughness and the pitch of the texture formed on the surface of the glass substrate, the composition and the depositing condition (such as a gas pressure) of the underlayer and the magnetic layer, the oriented ratio (OR) can be improved to 1.1 or more, more preferably, between 1.1 and 1.5. By adjusting the oriented ratio (OR) to the range between 1.1 and 1.5, a magnetic recording medium having excellent recording/reproducing characteristics, such as low medium noise (high S/N ratio), can be obtained.

As described above, according to this invention, it is possible to obtain a magnetic recording medium high in coercive force, excellent in magnetic anisotropy, and superior in thermal decay resistance. Furthermore, excellent recording/reproducing characteristics such as low medium noise (high S/N ratio) can be achieved.

What is claimed is:

1. A magnetic recording medium comprising a glass substrate having a principal surface on which at least a magnetic layer is formed, wherein:
    said glass substrate comprises an amorphous glass substrate, the principal surface of said amorphous glass substrate being provided with a texture having a predetermined surface roughness so that said magnetic layer is given circumferential magnetic anisotropy;
    said magnetic recording medium further comprising an AlRu alloy layer of a B2 crystal structure formed between said amorphous glass substrate and said magnetic layer and made of a material containing Al (aluminum) and Ru (ruthenium);
    said texture having a radial pitch equal to 0.005–0.05 μm, both inclusive, when said glass substrate is made of said amorphous glass substrate;
    said magnetic recording medium having an oriented ratio (OR) of 1.1 or more when said glass substrate is made of said amorphous glass substrate and when said AlRu alloy layer is of the B2 crystal structure, said oriented ratio (OR) being defined as a ratio of a magnetic characteristic in a circumferential direction to said magnetic characteristic in a radial direction, said magnetic characteristic being a coercive force (Hc).

2. A magnetic recording medium as claimed in claim 1, wherein:
    said magnetic recording medium has a coercive force of 2500 oersted or more in a circumferential direction thereof;
    said magnetic recording medium comprising a magnetic anisotropy inducing layer formed between said glass substrate and said magnetic layer so that said magnetic recording medium has an oriented ratio (OR) of 1.1 or more, said oriented ratio (OR) being defined as a ratio of a the magnetic characteristic (Hc) in a circumferential direction to said the magnetic characteristic (Hc) in a radial direction, said magnetic anisotropy inducing layer being said AlRu alloy layer.

3. A magnetic recording medium as claimed in claim 2, further comprising an alloy layer of an amorphous structure interposed between said glass substrate and said magnetic anisotropy inducing layer.

4. A magnetic recording medium as claimed in claim 3, wherein said magnetic recording medium has a coercive force of 2500 oersted or more in a circumferential direction thereof.

5. A magnetic recording medium as claimed in claim 1, wherein said magnetic recording medium has an oriented ratio (OR) between 1.1 and 1.5, said oriented ratio (OR) being defined as a ratio of a the magnetic characteristic (Hc) in a circumferential direction to said the magnetic characteristic (Hc) in a radial direction.

6. A magnetic recording medium as claimed in claim 1, further comprising an alloy layer of an amorphous structure interposed between said glass substrate and said AlRu alloy layer.

7. A magnetic recording medium as claimed in claim 4, wherein said magnetic recording medium has an oriented ratio (OR) between 1.1 and 1.5, said oriented ratio (OR) being defined as a ratio of a the magnetic characteristic (Hc) in a circumferential direction to said the magnetic characteristic (Hc) in a radial direction.

8. A magnetic recording medium as claimed in claim 4, further comprising an alloy layer of an amorphous structure interposed between said glass substrate and said AlRu alloy layer.

9. A magnetic recording medium as claimed in claim 5, further comprising an alloy layer of an amorphous structure interposed between said glass substrate and said AlRu alloy layer.

10. A magnetic recording medium as claimed in claim 1, wherein said glass substrate is made of an amorphous glass substrate chemically strengthened.

11. A magnetic recording medium as claimed in claim 1, wherein said texture comprises means for rendering a crystal grain size of said magnetic layer uniform in a plane parallel to said principal surface of said glass substrate.

12. A magnetic recording medium comprising a glass substrate having a principal surface on which at least a magnetic layer is formed, wherein:
    said glass substrate comprises an amorphous glass substrate, the principal surface of said amorphous glass substrate being provided with a texture having a predetermined surface roughness so that said magnetic layer is given circumferential magnetic anisotropy;
    said magnetic recording medium further comprising an AlRu alloy layer of a B2 crystal structure formed between said amorphous glass substrate and said magnetic layer and made of a material containing Al (aluminum) and Ru (ruthenium);
    said texture having a radial pitch equal to 0.005–0.05 μm, both inclusive, when said glass substrate is made of said amorphous glass substrate;
    said magnetic recording medium having an oriented ratio (OR) of 1.1 or more when said glass substrate is made of said amorphous glass substrate and when said AlRu alloy layer is of the B2 crystal structure, said oriented ratio (OR) being defined as a ratio of a magnetic characteristic in a circumferential direction to said magnetic characteristic in a radial direction, said magnetic characteristic being a product (Mrt) of residual magnetization (Mr) and film thickness (t).

13. A magnetic recording medium as claimed in claim 12, wherein:
said magnetic recording medium has a coercive force of 2500 oersted or more in a circumferential direction thereof;
said magnetic recording medium comprising a magnetic anisotropy inducing layer formed between said glass substrate and said magnetic layer so that said magnetic recording medium has an oriented ratio (OR) of 1.1 or more, said oriented ratio (OR) being defined as a ratio of the magnetic characteristic (Mrt) in a circumferential direction to the magnetic characteristic (Mrt) in a radial direction, said magnetic anisotropy inducing layer being said AlRu alloy layer.

14. A magnetic recording medium as claimed in claim 13, further comprising an alloy layer of an amorphous structure interposed between said glass substrate and said magnetic anisotropy inducing layer.

15. A magnetic recording medium as claimed in claim 12, wherein said magnetic recording medium has a coercive force of 2500 oersted or more in a circumferential direction thereof.

16. A magnetic recording medium as claimed in claim 12, wherein said magnetic recording medium has an oriented ratio (OR) between 1.1 and 1.5, said oriented ratio (OR) being defined as a ratio of the magnetic characteristic (Mrt) in a circumferential direction to the magnetic characteristic (Mrt) in a radial direction.

17. A magnetic recording medium as claimed in claim 12, further comprising an alloy layer of an amorphous structure interposed between said glass substrate and said AlRu alloy layer.

18. A magnetic recording medium as claimed in claim 15, wherein said magnetic recording medium has an oriented ratio (OR) between 1.1 and 1.5, said oriented ratio (OR) being defined as a ratio of the magnetic characteristic (Mrt) in a circumferential direction to the magnetic characteristic (Mrt) in a radial direction.

19. A magnetic recording medium as claimed in claim 15, further comprising an alloy layer of an amorphous structure interposed between said glass substrate and said AlRu alloy layer.

20. A magnetic recording medium as claimed in claim 16, further comprising an alloy layer of an amorphous structure interposed between said glass substrate and said AlRu alloy layer.

21. A magnetic recording medium as claimed in claim 12, wherein said glass substrate is made of an amorphous glass substrate chemically strengthened.

22. A magnetic recording medium as claimed in claim 12, wherein said texture comprises means for rendering a crystal grain size of said magnetic layer uniform in a plane parallel to said principal surface of said glass substrate.

* * * * *